United States Patent [19]
Chase

[11] Patent Number: 4,481,605
[45] Date of Patent: Nov. 6, 1984

[54] DISPLAY VECTOR GENERATOR UTILIZING SINE/COSINE ACCUMULATION

[75] Inventor: Karl L. Chase, Glendale, Ariz.

[73] Assignee: Sperry Corporation, New York, N.Y.

[21] Appl. No.: 354,972

[22] Filed: Mar. 5, 1982

[51] Int. Cl.³ ............ G06F 3/153
[52] U.S. Cl. ............ 364/719; 340/739; 340/732; 364/521
[58] Field of Search ............ 364/719, 720, 521; 340/739, 740, 732

[56] References Cited

U.S. PATENT DOCUMENTS

| | | | |
|---|---|---|---|
| 3,638,214 | 1/1972 | Scott | 364/719 |
| 3,674,999 | 7/1972 | Kelling | 364/719 |
| 3,691,551 | 9/1972 | Kashio | 364/720 |
| 3,938,130 | 2/1976 | Burnham | 340/740 |
| 4,023,027 | 5/1977 | Strathman et al. | 364/720 |
| 4,027,148 | 5/1977 | Rosenthal | 364/521 |
| 4,115,863 | 9/1978 | Brown | 364/719 |
| 4,311,997 | 1/1982 | Madni | 340/722 |
| 4,314,351 | 2/1982 | Postel | 364/719 |

*Primary Examiner*—Jerry Smith
*Assistant Examiner*—Michael R. Fleming
*Attorney, Agent, or Firm*—Howard P. Terry; Albert B. Cooper

[57] ABSTRACT

The vector generator comprises X and Y digital-to-analog converters providing X and Y deflection voltages to a cathode ray tube display. X and Y digital accumulators provide respective inputs to the X and Y digital-to-analog converters. The word lengths of the accumulators are wider than those of the digital-to-analog converters and the digital-to-analog converters derive their inputs from the most significant digits of the accumulators. X rate and Y rate signals proportional to the sine and cosine of the vector angle are applied as inputs to the respective accumulators which accumulate the rate signals with the present contents of the accumulators so as to generate linearly changing X and Y deflection signals. The vector angle is adjusted by changing the ratio of the sine to cosine inputs to the accumulators and the vector speed is controlled by increasing and decreasing the sine and cosine signals but maintaining the ratio therebetween the same. Preferably, the accumulator is implemented by an adder and latch combination providing the least significant portion of the accumulator with an up/down counter providing the most significant portion thereof.

24 Claims, 3 Drawing Figures

DISPLAY VECTOR GENERATOR UTILIZING SINE/COSINE ACCUMULATION

BACKGROUND OF THE INVENTION

1. Field of the Invention

The present invention relates to stroke writing cathode ray tube (CRT) displays particularly with respect to the vector generator therefor.

2. Description of the Prior Art

A variety of vector generator arrangements for stroke writing displays are known in the prior art. With such displays, images are formed by a composite of individually drawn vectors with concatenated vectors being utilized to compose display shapes and symbology. For present day applications, it is often desirable to display rotation of the images. A further desideratum of present day vector generators is precise control of vector writing speed whereby writing speeds may be fast enough for compatibility with present day processing rates and furthermore whereby smooth vectors may be written at a controlled slow speed. Slow vectors may be desirable to enhance display brightness without utilizing the conventional CRT brightness electronics. This is desirable since adjustment of the CRT brightness control often has a defocussing effect. The vector speed control may be utilized to adjust brightness on both shadow mask and penetration phosphor color CRTs as well as on other types of CRTs.

Analog vector generators utilizing analog ramp generators are known in the art. Such analog vector generators utilize an X ramp generator and a Y ramp generator to provide CRT deflection signals for generating the vectors. An X multiplier and a Y multiplier are utilized to rotate the images which results in a loss of precision. Such analog vector generators are generally incompatible with current digitally oriented systems and are imprecise, bulky and require significant amounts of power. The operating characteristics of the prior art analog vector generators drift with time and temperature thereby distorting the displayed images due to aging of the components.

Digital stroke vector generators are also known in the prior art. One type of digital vector generator prevalent in the art utilizes X and Y binary rate multipliers in the X and Y deflection axes respectively. The parallel digital multiplier inputs to the binary rate multipliers comprise the sine and cosine respectively of the angle of the vector to be drawn. The system clock signal applied to each of the binary rate multipliers is multiplied by the sine and cosine thereby providing X and Y clock pulse trains having pulse rates proportional to the sine and cosine. The X and Y clock pulses are counted in respective binary counters, the outputs of which provide digital X and Y position signals to respective X and Y digital-to-analog converters (DACs). The outputs of the X and Y DACs provide the X and Y deflection signals to the CRT.

State of the art DACs that are conventionally utilized in digital vector generators typically are twelve bits wide. Accordingly, in a rate multiplier vector generator utilizing twelve bit DACs, the sine and cosine rate inputs, the rate multipliers and the counters are also twelve bits wide. Thus, present day DACs providing twelve bit resolution can resolve to one part in 4,096. Such DACs have a settling time when changing from one value to another of approximately 300 nanoseconds. Therefore, when operating at maximum capability, the vector generator can traverse the full scale of the DAC range in approximately 1200 microseconds. Under such an arrangement, the input clock to the rate multipliers is 3.3 megahertz. This vector speed is an order of magnitude slower than typically required for CRT displays. If fewer bits are utilized, then vector speed may be increased with a concomitant and undesirable loss in resolution. Rate multiplier vector generators may additionally increase speed by utilizing a higher frequency clock input to the rate multipliers. Present day rate multipliers will accept frequencies up to thirteen megahertz. With such a clock input, the speed may be increased by a factor of 4 and if one bit is omitted from the DACs, an eight fold increase in speed can be achieved. It is appreciated in such an arrangement that because of the limited settling time of the DACs, the DACs are updated at a rate of approximately 3.3 megahertz.

The rate multiplier vector generator does not provide the resolution in X and Y deflection or the vector velocity control that is required in high performance CRT displays. Because of the inherent operation of rate multipliers, the beam does not move continuously in the X and Y directions and in fact the vector stops for a portion of time generally equal to (1-X rate) X (1-Y rate). This effect results in vectors having a granular appearance and the effect is exacerbated for low velocity vectors. With a rate multiplier vector generator, the velocity is reduced by reducing the sine and cosine rate inputs to the multipliers. This increases the proportion of clock cycles at which the rate multipliers do not produce any clock output. Thus, the velocity control is achieved by stopping the beam deflection more often and for longer durations for low velocity vectors. Instead, therefore, of generating a smooth slow vector, bright dots along the desired path result.

The resolution of rate multipliers cannot be improved further beyond that described above because the required frequency of the clock driving the rate multipliers would necessarily be higher than that accepted by present day rate multipliers. Thus, when complex display images which are composed of concatenated vectors is rotated or its perspective altered, errors of the individual vectors will accumulate to degrade the quality of the image. Increasing the length of the counters would not alleviate the problem since the rate multipliers cannot be driven fast enough to provide the required resolution. Displayed vectors are rotated by recomputing the sequence of sines and cosines for the incremental rotations of the vectors. With the limited accuracy and resolution of the rate multiplier vector generator as described above, the truncation errors of the arithmetic utilized in generating the sine and cosine values accumulate resulting in distortions of the rotating image.

A further prior art vector generator is disclosed in U.S. Pat. No. 4,115,863 issued Sep. 19, 1978 to Richard R. Brown entitled "Digital Stroke Display with Vector, Circle and Character Generation Capability" and assigned to the present assignee. The vector generator of said U.S. Pat. No. 4,115,863 generates vectors by applying clock pulses to an up/down counter which through a DAC provides the deflection voltage for one of the display X or Y axes. The clock pulses are applied through a gate to a second up/down counter which through a second DAC provides the deflection voltage for the other of the X and Y axes. The gate is controlled by the overflow of an accumulator that is repetitively accumulating, under control of the clock pulses, a signal representative of the desired slope of the vector. The DAC utilized in the display axis associated with the gated clock derives its input from both the associated up/down counter and the output of the associated accumulator for display resolution enhancement.

It is appreciated that in the vector generator of said U.S. Pat. No. 4,115,863, the display axis receiving the ungated clock has limited accuracy and resolution. Thus, when rotating display images comprised of concatenated vectors severe distortions occur for reasons similar to those discussed above. In addition, the vector generator of said U.S. Pat. No. 4,115,863 does not provide satisfactory vector velocity control and, therefore, the display brightness cannot be controlled as a function of vector writing speed. In such systems, display brightness must be controlled by the brightness circuitry of the apparatus which generally results in an undesirable alteration in focus with a change in brightness. The vector generator of said U.S. Pat. No. 4,115,863 suffers from non-uniform vector speed as a function of vector angle. It is desirable in such display systems to have as uniform a vector speed as possible for all vector angles. The vector generator of said U.S. Pat. No. 4,115,863 utilizes a complex octant switching arrangement to achieve proper vector orientation in the four display quadrants.

SUMMARY OF THE INVENTION

The present invention overcomes all of the above described disadvantages of the prior art by providing a vector generator comprising a digital accumulator for each of the X and Y axes of the display. In the preferred embodiment of the invention, the X and Y accumulators provide digital position signals to respective X and Y DACs, having outputs which provide the respective X and Y deflection signals to the display. The accumulators are wider than the respective DACs with the most significant bits of the accumulator providing the inputs to the DACs. Digital X and Y rate signals proportional to the sine and cosine of the vector angle are accumulated in the X and Y accumulators. The X and Y rate signals are combined with the contents of the accumulators at the least significant portions thereof.

DESCRIPTION OF THE PREFERRED EMBODIMENT

Figure 1:
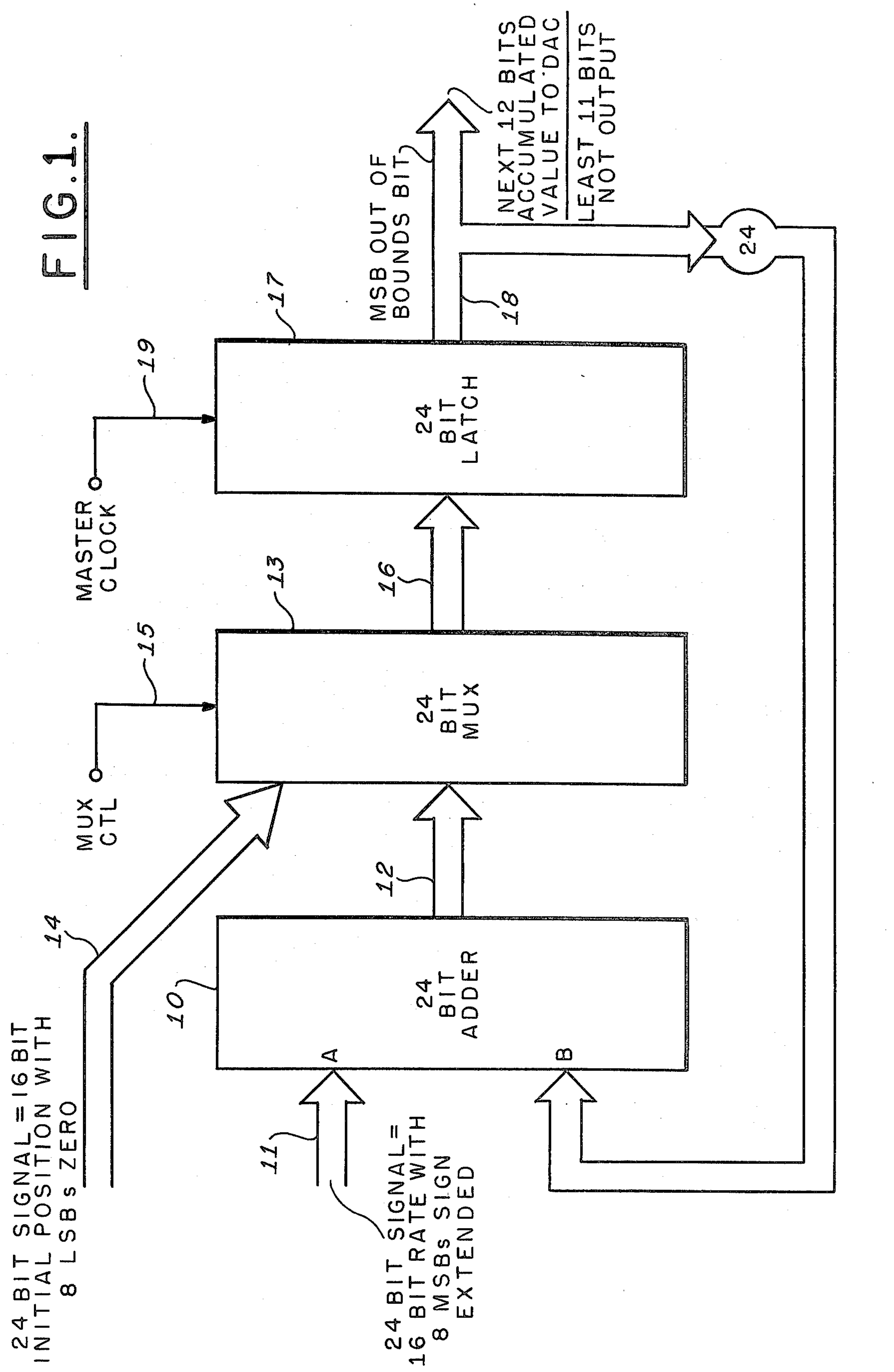
FIG. 1 is a schematic block diagram of an accumulator useful in practicing the invention.

Referring to FIG. 1, an accumulator for implementing in the present invention is illustrated. Two such accumulators are utilized in the invention; one for the X deflection axis and one for the Y deflection axis. In the preferred embodiment of the invention, the Y accumulator processes the vector sine and the X accumulator processes the vector cosine.

The accumulator comprises a twenty-four bit adder 10 configured in the preferred embodiment to perform two's complement arithmetic. The A input of the adder 10 is provided by a twenty-four bit bus 11 which accepts the rate signal to be accumulated. In the X accumulator, the X rate signal is proportional to the cosine of the vector angle and in the Y accumulator, the Y rate signal is proportional to the sine of the vector angle. The sine and cosine inputs to the respective accumulators are sixteen bit two's complement digital signals with the eight most significant bits thereof sign extended. The digital rate signal on the bus 11 is provided throughout the vector writing time and may be positive or negative with a value that controls beam deflection per clock cycle of between 0 and 1/256 of full screen range.

The twenty-four bit output of the adder 10 is provided on a bus 12 as an input to a twenty-four bit multiplexer 13. The vector initial position (X or Y) is provided on a twenty-four bit bus 14 as a second input to the multiplexer 13. The bus 14 provides a sixteen bit initial position to the multiplexer 13 with the eight least significant bits of the twenty-four bit word being zeroes. A multiplexer control signal is provided on a lead 15 to the multiplexer 13. The multiplexer control signal on the lead 15 controls the multiplexer 13 to connect either the bus 12 or the bus 14 to multiplexer output bus 16. The initial position bus 14 is connected to the multiplexer output bus 16 during the initial position load phase of the vector generator whereas the adder output bus 12 is connected to the bus 16 during the vector writing phase thereof.

The twenty-four bit output bus 16 from the multiplexer 13 is coupled as an input to a twenty-four bit latch 17. The twenty-four bit output from the latch 17 on a twenty four bit bus 18 is applied as the B input to the adder 10. The latch 17 also receives a master clock signal on a lead 19 which strobes the twenty-four bit input on the bus 16 into the latch 17. Thus, it is appreciated that the adder 10 combines the twenty-four bit accumulated value on the bus 18 with the twenty-four bit rate on the bus 11, which sum is strobbed into the latch 17 during each clock pulse on the lead 19. Therefore, for each clock pulse on the lead 19, the sum of the rate signal on the bus 11 with the accumulated value in the latch 17 is strobed into the latch. In this manner, the value in the latch 17 increases or decreases linearly. Since two's complement quantities and arithmetic are utilized, the sign of the rate signal on the bus 11 controls whether the value in the latch 17 will be incremented or decremented by the rate signal. The clock frequency on the lead 19 is selected to be as fast as the deflection DACs can convert the digital values from the latch 17 into analog equivalents. In other words, the frequency of the clock is selected to be as high as the settling time of the DACs will permit.

The twenty-four bit accumulated value on the bus 18 is utilized as follows. The most significant bit is an out-of-bounds signal that blanks the CRT video and staticizes the digital deflection signals to prevent the screen image from exhibiting the wraparound phenomenon where, for example, a symbol moves off screen at the top and appears at the bottom. Further details of utilizing the out-of-bounds bit will be provided hereinbelow. The next twelve most significant bits of the bus 18 provide the deflection signal to the DAC utilizing the full range of commercially procurable twelve-bit DACs. The remaining eleven bits of the bus 18 enhance long term accuracy by reducing buildup errors that occur over the span of many vectors when a group of vectors is rotated or otherwise transformed in, for example, a change of perspective.

In the operation of the accumulator of FIG. 1 prior to the initiation of vector writing, the master clock is stopped and the sixteen bit initial position on the bus 14 is loaded into the latch 17 through the multiplexer 13. Vector writing is initiated by starting the master clock on the lead 19. In a manner to be described below, the length of the vector is controlled by the number of clock pulses provided to the latch 17. At each clock pulse, the rate signal on the bus 11 is added to the previous value in the latch 17 and the sum is inserted into the latch 17. In this manner, the value in the latch 17 increases or decreases linearly thereby providing the deflection voltages for writing the vector.

Figure 2:
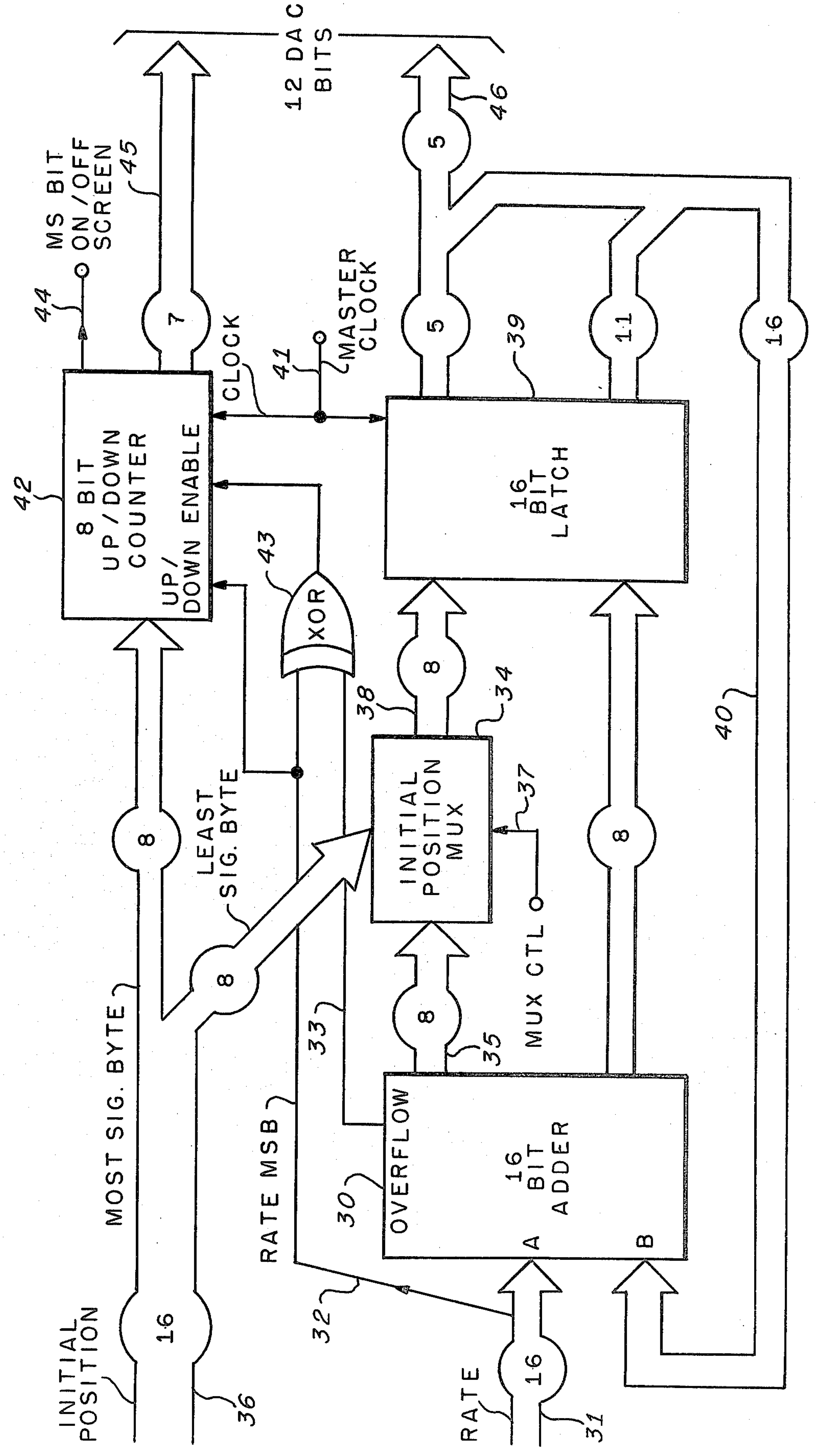
FIG. 2 is a block schematic diagram of a preferred version of an accumulator useful in practicing the invention.

Referring to FIG. 2, a preferred version of the accumulator for use in the present invention is illustrated. The accumulator of FIG. 2 is in effect twenty-four bits wide with the sixteen least significant bits implemented by an adder, multiplexer and latch and the eight most significant bits implemented by an up/down counter. Accordingly, a sixteen bit adder 30 receives the sixteen bit rate signal on a bus 31 at the A input thereof. Similar to that described above, the adder 30 is implemented to perform two's complement arithmetic with the rate signal on the bus 31 being in two's complement format. The most significant bit of the rate signal on the bus 31 is provided on a separate lead 32. The overflow from the adder 30 is provided on a lead 33. It is appreciated that when the rate is positive, the rate MSB signal on the lead 32 is binary ZERO. Conversely, when the rate is negative, the rate MSB signal on the lead 32 is binary ONE. Because of the two's complement format utilized, when the rate is positive, the adder 30 will add the rate to the value applied to be B input of the adder and when the rate is negative, the rate will be subtracted from the value applied at the B input to the adder. The signals on the leads 32 and 33 are utilized to control the up/down counter that implements the eight most significant bits of the twenty-four bit accumulator in a manner to be described.

The most significant byte from the adder 30 is applied as an input to an eight bit initial position multiplexer 34 via an eight bit bus 35. The sixteen bit initial vector position (X or Y) is applied to a bus 36, the least significant byte thereof being applied as a second input to the multiplexer 34. A multiplexer control signal on a lead 37 controls the multiplexer 34 to connect either the least significant byte of the initial position signal or the most significant byte from the adder 30 to an eight bit multiplexer output bus 38.

The eight bit output from the multiplexer 34 on the bus 38 and the least significant byte from the adder 30 provide a sixteen bit input to a sixteen bit latch 39. The sixteen bit output from the latch 39 is applied via a bus 40 as the B input to the adder 30. A master clock signal on a lead 41 strobes the latch 39 thereby entering the sixteen bit data from the multiplexer 34 and the adder 30. In a manner similar to that described above with respect to FIG. 1, the master clock signal on the lead 41 is of a frequency commensurate with the settling time of the DACs.

Thus, it is appreciated that the least significant sixteen bits of the twenty-four bit accumulator of FIG. 2 are implemented utilizing the sixteen bit adder 30, the eight bit multiplexer 34 and the sixteen bit latch 39. The eight most significant bits of the accumulator are implemented by an eight bit up/down counter 42. The counter 42 is set to its initial position (X or Y) by the most significant byte of the initial position signal on the bus 36. The clock input to the counter 42 is provided by the master clock signal on the lead 41 and the up/down control for the counter is provided by the rate most significant bit on the lead 32. Carry out logic implemented in the present embodiment by an exclusive OR gate 43 has an output connected to the enable input of the counter 42. The inputs to the exclusive OR gate 43 are provided by the rate most significant bit on the lead 32 and the adder overflow signal on the lead 33. Because of the two's complement configuration of the adder 30 and the two's complement format of the initial position signal and the rate signal, the counter 42 is controlled to count upwardly when the rate signal on the bus 31 is positive and downwardly when the rate signal is negative. The exclusive OR gate 43 enables the counter 42 only when the rate signal is positive and there is an overflow on the lead 33 or when the rate signal is negative and there is no carry on the lead 33. For all other conditions, the counter 42 is disabled. Thus, it is appreciated that the counter 42 functions as an accumulator permitted to change count from one clock pulse to the next by +1, −1 or 0.

It is appreciated from the foregoing that the adder 30 and the latch 39 comprise a sixteen bit parallel accumulator for accumulating the rate signal on the bus 31. The counter 42 constitutes an eight bit accumulator for accumulating the carries from the sixteen bit accumulator. It is advantageous to utilize the up/down counter 42 as an accumulator because of the simplicity thereof compared to a conventional accumulator. The disadvantage of this arrangement is that the vector speed is limited to 1/128th of the full screen range per clock cycle. This speed is sufficient for practical applications of the invention.

The most significant bit from the counter 42 is provided on a lead 44 and is utilized as the out-of-bounds bit described above with respect to FIG. 1. The seven least significant bits of the counter 42 are provided on a bus 45 as the seven most significant input bits to the DAC. The five least significant bits of the DAC are provided on a bus 46 from the five most significant bits of the latch 39. Thus, it is appreciated that the accumulator of FIG. 2 provides a digital position signal utilizing all twelve of the DAC bits. The eleven least significant bits of the latch 39 are not provided as an output to the DAC but are utilized in the manner described above with respect to FIG. 1 to enhance vector writing precision.

Figure 3:
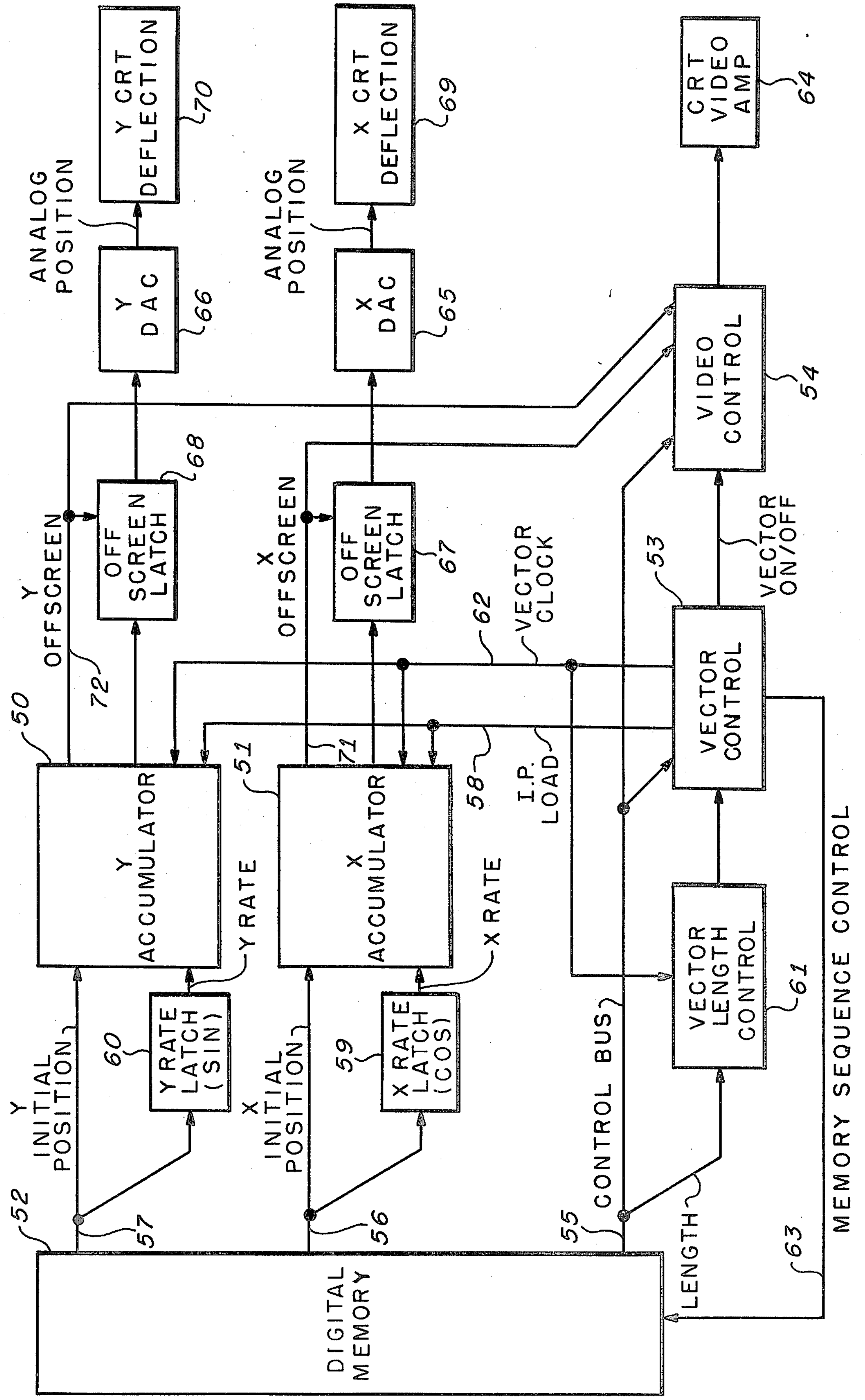
FIG. 3 is a schematic block diagram of a vector generator implemented in accordance with the present invention.

Referring to FIG. 3, a vector generator utilizing the accumulation technique described above is illustrated. The vector generator includes a Y-accumulator 50 and an X-accumulator 51 which may be implemented utilizing either the accumulator of FIG. 1 or the accumulator of FIG. 2 or an equivalent thereof. The accumulator of FIG. 2 is utilized in implementing the preferred embodiment of the invention and FIG. 3 will be accordingly described.

The vector generator includes a digital memory 52 for providing the sixteen-bit X and Y initial position signals, the sixteen-bit X and Y rate signals (cosine and sine) as well as a length control signal. The memory 52 also provides numerous conventional control signals for controlling the loading and writing sequences of the display. The memory 52 is part of a conventional microprocesser system for generating and providing the sequences of instruction which specify the vectors to be drawn. The vector generator of FIG. 3 also includes vector control circuitry represented schematically at 53 and video control circuitry represented schematically at 54. The digital memory 52 provides system control signals to the vector control circuitry 53 as well as to the video control circuitry 54 via a control bus 55. During the initial position loading phase for a vector, X and Y initial position values are provided on buses 56 and 57, respectively, to position a symbol on the CRT. The X and Y initial position values may be loaded separately or simultaneously and a new initial position may be provided before each vector or may be provided only before the first of a group of vectors. The vector control 53 via initial position load line 58 controls multiplexers 34 and counters 42 (FIG. 2) within the accumulators 50 and 51 to load X and Y initial positions therein.

The X and Y rate values, which generally vary for each vector, are latched throughout the vector writing time. Accordingly, the digital memory 52 provides the X rate signal and the Y rate signal to respective latches 59 and 60. Each vector will generally have a different length which is loaded prior to the vector writing phase. The length value is provided on the control bus 55 and loaded into vector length control circuit 61. The length value designates the number of clock pulses from the beginning to the end of the vector to be written. Under the control of signals on the control bus 55, the vector control circuits 53 initiate the writing of a vector by providing the vector clock signal to the accumulators 50 and 51 on a lead 62. The vector clock pulses on the lead 62 are provided to the master clock input of FIG. 1 or FIG. 2. The vector clock pulses on the lead 62 are also provided to the vector length control 61 wherein an end of vector signal is provided to the vector control 53 when the designated number of clock pulses for the vector are received. A binary counter may be utilized to effect this length control. When the end of vector signal is received by the vector control 53, the vector clock 62 is stopped and the next vector instructions are requested from the digital memory 52 via a memory sequence control signal on a lead 63. During the writing of the vector, the vector control 53 enables the video control circuits 54 to provide video to the CRT display via a CRT video amplifier 64. The video control 54 may be controlled to blank video on predetermined vectors, to specify levels of intensity and in color displays to specify the color. The present invention may be used as the vector generator for the CRT display system of U.S. Patent Application No. 304,451, entitled "Color and Brightness Tracking in a Cathode Ray Tube Display System", by Narveson et al, filed Sep. 22, 1981 and assigned to the present assignee (now U.S. Pat No. 4,386,345).

Each of the X and Y accumulators 51 and 50 provide twelve DAC bits to respective X DAC 65 and Y DAC 66 via respective twelve bit offscreen latches 67 and 68. The X and Y DACs 65 and 66 provide X and Y analog position signals to respective X and Y CRT deflection circuits 69 and 70. The DAC bits from the accumulators 50 and 51 are those discussed above provided by the buses 45 and 46 of FIG. 2. The offscreen latches 67 and 68 also receive respective X and Y offscreen bits on leads 71 and 72 from the respective accumulators 51 and 50. The offscreen bits on the leads 71 and 72 are provided as discussed above with respect to lead 44 of FIG. 2.

The offscreen latches 67 and 68 transmit the vector data from the accumulators 51 and 50 to the DACs 65 and 66 only when enabled by the respective X and Y offscreen bits on the leads 71 and 72. The latches 67 and 68 are utilized to prevent the DACs 65 and 66 from exhibiting wrap-around of symbols where, for example, a symbol will move offscreen at the top only to reappear at the bottom. The latches 67 and 68 staticize the vector position at the screen edge until the vector returns back on screen. The X and Y offscreen bits are also utilized to blank the video via video control circuits 54 when the vector goes off screen. The out-of-bound bit from each accumulator as discussed above controls these functions.

Thus, it is appreciated that vectors are generated in a point by point fashion via the above-described accumulation technique wherein the cosine and sine of the vector angle are added repetitively to the respective X and Y accumulators. Utilizing sine and cosine ensures constant writing speeds at all angles. The sixteen bit angular data is added to the least significant bits of the twenty-four bit accumulator and the deflection DACs receive inputs from the most significant bits. The processor can select any writing speed by appropriate scaling of the sine and cosine words. To alter the writing speed, the sine and cosine words are each multiplied by a predetermined writing speed control constant where for a given vector angle the ratio of sine to cosine is maintained constant. The vector angle is adjusted by changing the ratio of the sine to cosine signals. Because the accumulators are not cleared between successive vectors complex figures may be rotated without detectable distortion. Closed curves remain closed and the rotation is performed so smoothly that steps are not seen and all lines continue to meet. The present invention provides precise vector positioning and exceptional speed control even for slow vectors. Exceptional precision is achieved because the sixteen bits of positional data are accumulated with a retention of twenty-four bits of position. All twelve DAC bits are utilized in both axes and accumulated truncation error is reduced to an undetectable negligible amount.

Because of the two's complement format of the data and the accumulators, vectors are positioned in all quadrants without complex switching. The vector generator of the present invention provides high resolution while operating at low computation speeds. In the present embodiment, the starting point of a vector is specified to an accuracy of one part in 16,384. Each point of the vector, as it is positioned, has an inherent accuracy of one part in 8,000,000 and the displayed accuracy of each point is limited by the DAC to one part in 4,096. The resultant vectors are eight times closer to an ideal line than the prior art rate multiplier vector generators discussed above. It will furthermore be appreciated that because of the two's complement arithmetic format utilized in the present invention, positive or negative quantities may be added or subtracted from positive or negative accumulated balances in any combination to provide the proper vector orientation and magnitude in all quadrants of the display.

Although the preferred embodiment of the invention was described in terms of a CRT display, it is appreciated that the present invention is applicable to other display technologies such as X-Y plotters and flat panel displays with or without digital addressing. It is furthermore appreciated that although the present invention was described in terms of sixteen bit rate and initial position signals, twenty-four bit accumulators and twelve bit DACs, the invention may be implemented utilizing signals and components of different word lengths than those disclosed to the same effect. With respect to FIGS. 1 and 2, although the multiplexer 13 of FIG. 1 is illustrated as spanning twenty-four bits whereas the multiplexer 34 of FIG. 2 is illustrated as spanning only the most significant byte of the adder 30, it is appreciated that a shorter multiplexer may be utilized in the embodiment of FIG. 1 and a longer multiplexer may be utilized in the embodiment of FIG. 2.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Vector generator apparatus for a display having X and Y display axes and X and Y deflection means therefore, respectively, said deflection means being responsive to digital X and Y deflection signals, respectively, each comprising a predetermined number of bits, said apparatus comprising a source of a digital X rate signal, a source of a digital Y rate signal, X accumulator means providing a digital output signal having a greater number of bits than said predetermined number, the most significant bits thereof providing said digital X deflection signal, said digital X rate signal comprising fewer bits than said X accumulator means and being applied to said X accumulator means for repetitive accumulation thereof with respect to the least significant bits thereof, so as to incrementally change said X deflection signal in a linear fashion, and Y accumulator means providing a digital output signal having a greater number of bits than said predetermined number, the most significant bits thereof providing said digital Y deflection signal, said digital Y rate signal comprising fewer bits than said Y accumulator means and being applied to said Y accumulator means for repetitive accumulation with respect to the least significant bits thereof, so as to incrementally change said Y deflection signal in a linear fashion.

2. The apparatus of claim 1 wherein one of said X and Y rate signals is representative of the sine of the angle of a vector to be generated and the other of said rate signals is representative of the cosine of said angle.

3. The apparatus of claim 1 in which said X and Y accumulator means include means for presetting said accumulator means with digital X and Y initial position signals, respectively.

4. The apparatus of claim 3 in which said X and Y accumulator means are configured to perform two's complement arithmetic and said digital X and Y rate signals and said digital X and Y initial position signals are in two's complement format.

5. The apparatus of claim 1 in which said display comprises cathode ray tube means having a beam as well as X and Y beam deflection means for positioning said beam along said X and Y display axes, respectively.

6. The apparatus of claim 5 in which said X and Y deflection means comprises said X and Y beam deflection means, respectively, and X and Y digital-to-analog converter means, respectively, responsive to said digital X and Y deflection signals for providing corresponding X and Y analog position signals to said X and Y beam deflection means, respectively.

7. The apparatus of claim 6 further including X and Y offscreen latches for coupling said digital X and Y deflection signals to said X and Y digital-to-analog converter means respectively, said X and Y offscreen latches being responsive to the most significant bit of said X and Y accumulator means, respectively, for staticizing said digital X and Y deflection signals, respectively, under control of said respective most significant bits.

8. The apparatus of claim 1 in which each said X and Y accumulator means comprises adder means having first and second inputs and an output, multiplexer means having first and second inputs and an output, said first input of said multiplexer means being coupled to receive said output of said adder means, and latch means having an input and an output, said input of said latch means being coupled to said output of said multiplexer means and said output of said latch means being coupled to said first input of said adder means with said second input of said adder means coupled to receive said digital rate signal, said latch means having a clock input for latching into said latch means signals applied to said input of said latch means, the most significant bits of said latch means of said X and Y accumulator means providing said digital X and Y deflection signals, respectively.

9. The apparatus of claim 8 in which said display comprises cathode ray tube means having a beam as well as X and Y beam deflection means for positioning said beam along said X and Y display axes, respectively, and said X and Y deflection means comprises said X and Y beam deflection means, respectively, and X and Y digital-to-analog converter means, respectively, responsive to said digital X and Y deflection signals for providing corresponding X and Y analog position signals to said X and Y beam deflection means, respectively.

10. The apparatus of claim 9 further including X and Y offscreen latches for coupling said digital X and Y deflection signals to said X and Y digital-to-analog converter means respectively, said X and Y offscreen latches being responsive to the most significant bit of said latch means of said X and Y accumulator means, respectively, for staticizing said digital X and Y deflection signals under control of said respective most significant bits.

11. The apparatus of claim 8 further including a source of clock pulses coupled to said clock input for controlling the accumulation of said X and Y rate signals in said X and Y accumulator means, respectively, and means for controlling the number of clock pulses applied to said clock input in accordance with a vector length signal, thereby controlling the length of generated vectors.

12. The apparatus of claim 8 with said second inputs of said multiplexer means of said X and Y accumulator means, respectively, coupled to receive digital X and Y initial position signals, respectively, thereby providing means for presetting said X and Y accumulator means with said digital X and Y initial position signals.

13. The apparatus of claim 12 in which said adder means is configured to perform two's complement arithmetic and said digital X and Y rate signals and said digital X and Y initial position signals are in two's complement format.

14. The apparatus of claim 1 in which each said X and Y accumulator means comprises a least significant bits accumulator constituting the least significant portion of said accumulator means, and an up/down counter responsive to said least significant bits accumulator for counting the overflows thereof, said up/down counter constituting the most significant portion of said accumulator means.

15. The apparatus of claim 14 in which said least significant bits accumulator comprises an adder, a multiplexer coupled to said adder, and a latch responsive to said multiplexer, said adder being responsive to the output of said latch, said latch having a clock input for latching into said latch signals applied to the input of said latch.

16. The apparatus of claim 15 in which each said digital deflection signal is comprised of at least a portion of the output bits of said counter and the most significant bits of said latch.

17. The apparatus of claim 15 with said counter and said multiplexer coupled to receive a digital initial position signal, thereby presetting said X and Y accumulator means with digital X and Y initial position signals respectively.

18. The apparatus of claim 17 in which said adder is configured to perform two's complement arithmetic and said digital rate signals and said initial position signals are in two's complement format.

19. The apparatus of claim 15 in which said multiplexer is coupled between said adder and said latch for transmitting a portion of the output of said adder to said latch; the remainder of the output of said adder being transmitted directly to said latch.

20. The apparatus of claim 15 further including overflow logic responsive to the most significant bit of said digital rate signal and to the overflow of said adder for controlling said counter to count the overflows of said least significant bits accumulator.

21. The apparatus of claim 14 in which each said digital deflection signal is comprised of at least a portion of the output bits of said counter and the most significant bits of said least significant bits accumulator.

22. The apparatus of claim 21 in which said display comprises cathode ray tube means having a beam as well as X and Y beam deflection means for positioning said beam along said X and Y display axes, respectively, and said X and Y deflection means comprise said X and Y beam deflection means, respectively, and X and Y digital-to-analog converter means, respectively, responsive to said digital X and Y deflection signals for providing corresponding X and Y analog position signals to said X and Y beam deflection means, respectively, 23. The apparatus of claim 22 further including X and Y offscreen latches for coupling said digital X and Y deflection signals to said X and Y digital-to-analog converter means, respectively, said X and Y offscreen latches being responsive to the most significant bit of said counter of said X and Y accumulator means, respectively, for staticizing said digital X and Y deflection signals, under control of said respective most significant bits.

24. The apparatus of claim 1 further including a source of clock pulses for controlling the accumulation of said X and Y rate signals in said X and Y accumulator means, respectively, and means for controlling the number of clock pulses applied to said X and Y accumulator means in accordance with a vector length signal, thereby controlling the length of generated vectors.

* * * * *